United States Patent
Ferreira et al.

(10) Patent No.: US 11,337,071 B2
(45) Date of Patent: May 17, 2022

(54) METHOD FOR MANAGING THE REPUTATION LEVEL OF A COMMUNICATION DEVICE

(71) Applicant: THALES DIS FRANCE SA, Meudon (FR)

(72) Inventors: Marcio Ferreira, Meudon (FR); Sébastien Schmitt, Meudon (FR); Gérald Maunier, Meudon (FR); Ludovic Tressol, Meudon (FR); Frédéric Dao, Meudon (FR); Cédric Boutie, Meudon (FR); David Huguenin, Meudon (FR)

(73) Assignee: THALES DIS FRANCE SAS, Meudon (FR)

(*) Notice: Subject to any disclaimer, the term of this patent is extended or adjusted under 35 U.S.C. 154(b) by 134 days.

(21) Appl. No.: 16/606,492

(22) PCT Filed: Apr. 11, 2018

(86) PCT No.: PCT/EP2018/059266
§ 371 (c)(1),
(2) Date: Oct. 18, 2019

(87) PCT Pub. No.: WO2018/192818
PCT Pub. Date: Oct. 25, 2018

(65) Prior Publication Data
US 2021/0120419 A1    Apr. 22, 2021

(30) Foreign Application Priority Data
Apr. 20, 2017 (EP) .................................. 17305455

(51) Int. Cl.
*H04L 29/06* (2006.01)
*H04W 12/10* (2021.01)
(Continued)

(52) U.S. Cl.
CPC .......... *H04W 12/10* (2013.01); *H04L 63/126* (2013.01); *H04L 63/1466* (2013.01); *H04W 4/70* (2018.02); *H04W 12/63* (2021.01)

(58) Field of Classification Search
CPC ..... H04W 12/10; H04W 4/70; H04W 12/122; H04W 12/63; H04W 12/65; H04W 4/46;
(Continued)

(56) References Cited

U.S. PATENT DOCUMENTS

2013/0093618 A1    4/2013 Oh et al.
2016/0381079 A1*  12/2016 Ben-Shalom ......... H04L 63/105
                                                                  726/29

FOREIGN PATENT DOCUMENTS

| EP | 3029971 A1 | 6/2016 |
| JP | 2014078911 A | 5/2014 |
| KR | 101231534 B1 | 2/2013 |

OTHER PUBLICATIONS

Li et al., A Reputation-Based Announcement Scheme for VANETs, 2012, IEEE Transactions on Vehicular Technology, vol. 61. (Year: 2012).*

(Continued)

*Primary Examiner* — Trong H Nguyen
(74) *Attorney, Agent, or Firm* — The Jansson Firm; Pehr B. Jansson

(57) ABSTRACT

The invention relates to a method for managing the reputation level of a first communication device (100), said reputation level (103) being stored into a first secure enclave (102) embedded in said first communication device (100). The method comprises the steps of: receiving from the first communication device (100) by a second communication device (110) an information message; verifying that the information message is consistent with data obtained from a sensor embedded in the second communication device (110); generating a feedback message by the second com- (Continued)

munication device (110) to be transmitted to the first communication device (100) indicating if the information message is consistent for the secure enclave (102) of the first communication device (100) to update its reputation level.

18 Claims, 4 Drawing Sheets

(51) Int. Cl.
 *H04W 4/70* (2018.01)
 *H04W 12/63* (2021.01)
(58) Field of Classification Search
 CPC ... H04W 12/12; H04L 63/126; H04L 63/1466
 See application file for complete search history.

(56) References Cited

OTHER PUBLICATIONS

Liu et al., LSOT: A Lightweight Self-Organized Trust Model in VANETs, 2016, Hindawi Publishing Corporation Mobile Information Systems, vol. 2016. (Year: 2016).*
Chen et al., A Trust Modeling Framework for Message Propagation and Evaluation in VANETs, 2010, IEEE. (Year: 2010).*
J. Oluoch, A Distributed Reputation Scheme for Situation Awareness in Vehicular Ad Hoc Networks (VANETs), 2016, IEEE. (Year: 2016).*
Robert K. Schmidt et al: "Vehicle Behavior Analysis to Enhance Security in VANETs", (Dec. 31, 2008), XP055398478, Retrieved from the Internet: URL:https://pdfs.semanticscholar.org/b939/0619761fcb3eac31592c1393b5047fa70f.pdf [retrieved on Aug. 14, 2017] pp. 3, 4, 6; figures 1, 2.
"ETSI TR 102 893 V1.1.1., Intelligent Transport Systems (TTS); Security; Threat, Vulnerability and Risk Analysis (TVRA)", Technical Report, European Telecommunications Standards Institute (ETSI), 650, Route Des Lucioles ; F-06921 Sophia-Antipolis ; France , vol. ITS WG5, No. V1.1.1 (Mar. 1, 2010), pp. 1-86, XP014046283, Retrieved from the Internet: URL:http://www/etsi.org/deliver/etsi_tr/102800_102899/102893/01.01.01_60/tr_102893v010101p.pdf [retrieved on Aug. 14, 2017] p. 58-pp. 59, 75; table 20.
Shukla, Dilendra et al: "Security and attack analysis for vehicular ad hoc netework—A survey", 2016 International Conference on Computing, Communication and Automation (ICCCA), IEEE, (Apr. 29, 2016), pp. 625-630, XP033039627, DOI: 10.1109/CCAA.2016.7813797 Section 11: p. 626.
PCT/EP2018/059266, International Search Report, dated Jun. 6, 2016, European Patent Office, P.B. 5818 Patentiaan 2 NL-2280 HV Rijswijk.
PCT/EP2018/059266, Written Opinion of the International Searching Authority, dated Jun. 6, 2018, European Patent Office, D-80298 Munich, Germany.

* cited by examiner

|  | SE Reputation | SE Number feedbacks | Peers Trust level |
|---|---|---|---|
| Device 1 | 90 | 90 | 100% |
| Device 2 | 100 | 200 | 75 % |

| Last N message counter values sent | Next counter value |
|---|---|
| 154 | 159 |
| 155 | |
| Already received feedback | |
| 157 | |
| 158 | |

| Feedback counter received | Handling by SE |
|---|---|
| 150 | Rejected (not in the last N) |
| 159 | Rejected (greater than current value) |
| 156 | Rejected (already received) |
| 154 | Accepted, will impact reputation |

METHOD FOR MANAGING THE REPUTATION LEVEL OF A COMMUNICATION DEVICE

TECHNICAL FIELD

The present invention relates to a method for managing the reputation level of a communication device. It is applicable to the Internet of things and vehicle-to-everything (V2X) technologies.

BACKGROUND OF THE INVENTION

The international Telecommunication Union (ITU) defines the Internet of Things (IoT) in the ITU-T Y.2060 recommendation as a "global infrastructure for the information society, enabling advanced services by interconnecting (physical and virtual) things based on existing and evolving interoperable information and communication technologies". The Internet of Things integrates different technologies including Machine-to-Machine (M2M) communications referring to the technologies enabling direct communications between devices. Further, M2M communications can be used in the context of vehicle-to-everything (V2X) communications, that is to say between a first wireless communication device embedded in a vehicle and a second wireless communication device implemented on another material such as a second vehicle, an infrastructure or a pedestrian.

The number of IoT devices is growing fast and devices such as car embedded wireless communication devices will have to manage huge volumes of data. In some scenarios like autonomous vehicles, critical decisions have to be made almost instantaneously based on data received from other devices. It is crucial in term of security that this information is trustable, for example a device with an appropriate reputation level.

In an IoT network with a large amount of IoT devices, the communication between these devices may involve a large amount of data. The IoT devices need to evaluate the level of trust of the received data and decide which data must be taken into account and which data should be discarded.

A centralized reputation system receiving all the data from IoT devices in order to route them towards other IoT devices might not be appropriate in this context, due to the large amount of data, devices and latency constraints, as well as a long range communication mechanism whereas some IoT interactions may only be in proximity.

SUMMARY OF THE INVENTION

This invention relates to a method for managing the reputation level of a first communication device, said reputation level being stored into a first secure enclave embedded in said first communication device, the method comprising the steps of:
  receiving from the first communication device by a second communication device an information message;
  verifying that the information message is consistent with data obtained from a sensor embedded in the second communication device;
  generating a feedback message by the second communication device indicating if the information message is consistent for the secure enclave of the first communication device;
  transmit the feedback message to the first communication device (100, 200) for the first secure enclave to update its reputation level according to this feedback message.

According to an embodiment, the reputation level of the first communication device is received by the second communication device together with the information message, the information message being considered as a trusted information by the second communication device if the received reputation level is greater than a predefined threshold.

As an example, the information message is received together with a signature generated by the first secure enclave using a security key, said first secure enclave storing the security key, the method comprising the step of verifying by the second communication device the security signature in order to authenticate the first communication device as the emitter of said information message.

According to an aspect of the invention, the feedback message is either positive in case the information message is consistent with the data obtained from a sensor embedded in the second communication device or negative otherwise.

For example, the reputation level of the first communication device is increased when receiving a positive feedback message.

In one embodiment, the reputation level of the first communication device is decreased when receiving a negative feedback message.

The invention also relates to a first communication device comprising a first secure enclave storing a reputation level of said first communication device, configured to:
  send to a second communication device an information message;
  receive a feedback message generated by the second communication device and representative of the result of a verification performed by said second communication device of the consistency of the information message with at least one local data obtained from a sensor embedded in the second communication device;
  update the reputation level by the first secure enclave according to the received feedback message.

As an example, the first communication device is configured to transmit the information message together with its reputation level for said information message to be taken into account by the second electronic device only if said reputation level is greater than a predefined threshold.

According to an aspect of the invention, a sliding window of length N corresponding to the last N successive information messages that have been transmitted is used such that only the feedback messages corresponding to these N information messages are taken into account to update the reputation level of said first communication device.

According to another aspect of the invention, a maximum of M feedback messages is taken into account for a given information message.

The invention also relates to a second communication device configured to:
  receive an information message from a first communication device comprising a first secure enclave storing a reputation level of said first communication device;
  verify that the information message is consistent with least one local data obtained from a sensor embedded in the second communication device;
  generating a feedback message indicating if the information message is consistent and transmitting said feedback message to the first communication device for the first secure enclave of the first communication device to update the reputation level.

According to an aspect of the invention, the second communication device comprises a second secure enclave configured to generate a security signature to be transmitted together with the feedback message for the first communication device to be capable of authenticating the second communication device.

The invention also relates to a communication system comprising at least a first communication device as described above and a second communication device as described above.

The invention also relates to a computer program product comprising instructions which, when the program is executed by a computer, cause the computer to carry out the steps of the method described above.

BRIEF DESCRIPTION OF THE DRAWINGS

Additional features and advantages of the invention will be more clearly understandable after reading a detailed description of one preferred embodiment of the invention, given as an indicative and non-limitative example, in conjunction with the following drawings.

DETAILED DESCRIPTION

In this description, a secure enclave refers to a secure area that is adapted to store data and to protect their integrity and confidentiality and comprising a set of at least one hardware and/or software components. This secure enclave can be implemented for example into a processor in the form of a Trusted Execution Environment (TEE) or as a secure element.

Secure elements are small devices comprising a memory, a microprocessor and an operating system for computing treatments. Such secure elements may comprise a plurality of memories of different types. They are called "secure" because they are able to control the access to the data they contain and to authorize or not the use of data by other machines. The secure elements may also provide computation services based on cryptographic components. In general, secure elements have limited computing resources and are intended to be connected to a host machine. Secure elements may be removable or fixed to a host device. Smart cards are portable secure elements.

In this description, the expression IoT device refers to a piece of equipment with communication capabilities and optionally capacity of data capture, sensing, data storage, sensing and/or data processing. An IoT device comprises for example a wireless communication module also called Machine Type Communication (MTC) module allowing transmission of data from one IoT device to another or exchange of data between machines through UMTS/HSDPA, CDMA/EVDO, LTE, 5G, LoRa or other networks. The invention applies to IoT devices but more generally to communication devices maintaining securely their own reputation level. As an example, a communication device can be a connected vehicle.

In the description, the reputation level of a given communication device corresponds to an information representative of the level of trust it provides regarding data exchanges with other communication devices. As an example, data that is transmitted by a first communication device associated with a reputation level which is below a predefined threshold value will not be considered as reliable by a second communication device and can be discarded or ignored.

A sensor refers to a component composed of hardware and/or software and designed to capture information from the physical world and to provide data representative of this captured information.

Figure 1:
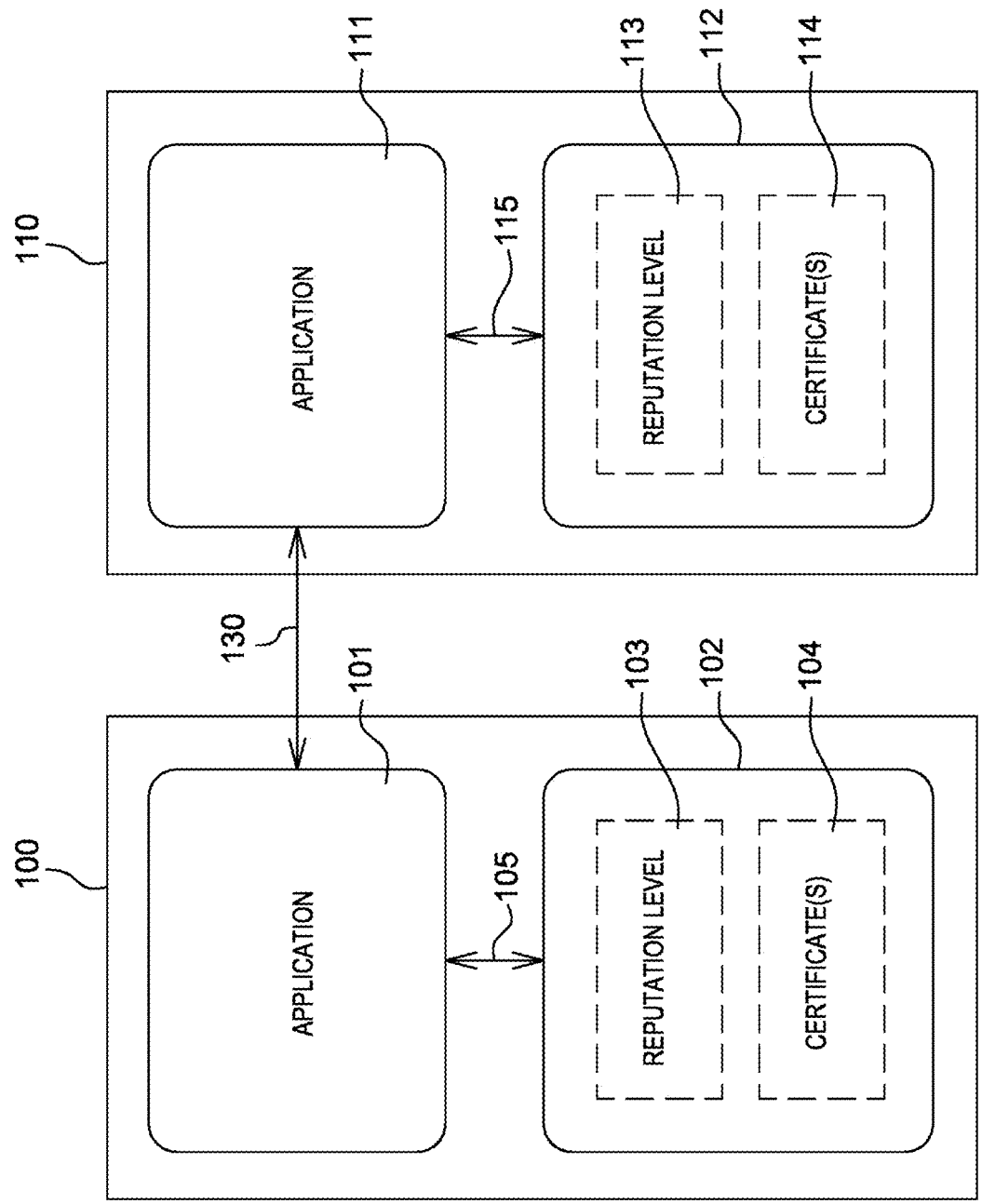
FIG. 1 schematically illustrates two communication devices with the capabilities of monitoring respectively their reputation level.

FIG. 1 schematically illustrates two communication devices with the capabilities of monitoring respectively their reputation level.

Two communication devices 100, 110 are represented in a very simplified way. They both comprise an application 101, 111 and a secure enclave 102, 112.

The application 101, 111, and the secure enclave 102, 112 of each communication device are configured so that they can exchange 130 data through an appropriate interface 105, 115. As an example, the application is implemented into a central processing unit (CPU) and the secure enclave is a secure element interfaced with the central processing unit. However, the skilled person will easily consider that other configurations can be used for implementing the described technology. For example, a single processor can implement both the application and the secure enclave. In that case, the secure enclave is for example implemented in a trusted execution environment of the processor.

According to this invention, each device maintains its own reputation level 103, 113 in its own secure enclave 102, 112. The reputation level is then transmitted for example at the time of transferring 130 data from one communication device to another.

Further, one or several electronic certificates 104, 114 can be stored into the secure enclave of each communication device 100, 110. For example an electronic certificate and its associated private key can be provisioned during the personalisation phase of the manufacturing process of a given communication device.

The reputation level of the communication devices is memorized and updated by their secure enclave. What is processed and memorized by the secure enclave is not accessible by any user of the device. This is one aim of the invention to provide a technology allowing a communication device to maintain its own reputation level using feedback messages provided by other communication devices without allowing any unauthorized third party to interfere with this process, in particular the users of the devices.

An important aspect of the invention is that when a communication device 110 receives an information message from another communication device 100, it checks its consistency using local data, that is to say data obtained locally by communication device 110. According to a preferred embodiment, local data correspond to data provided by at least one sensor embedded or interfaced with the communication device 110 or measurements that are obtained from data provided by this at least one sensor.

According to the invention, the result of the consistency verification is used as a basis to generate message containing a feedback transmitted to the communication device 100 by the communication device 110. This feedback message will be used by the communication device 100 to update its own reputation level, for example increase or decrease the reputation level. The feedback message can be of two types: "positive feedback" when the received information message is consist with the local data or "negative feedback" when the consistency verification failed. According to another embodiment, the feedback message can comprise more than two levels of consistency, corresponding for example to a scale from one to four, one corresponding to a "very positive" feedback, four to a "very negative" feedback.

Figure 2:
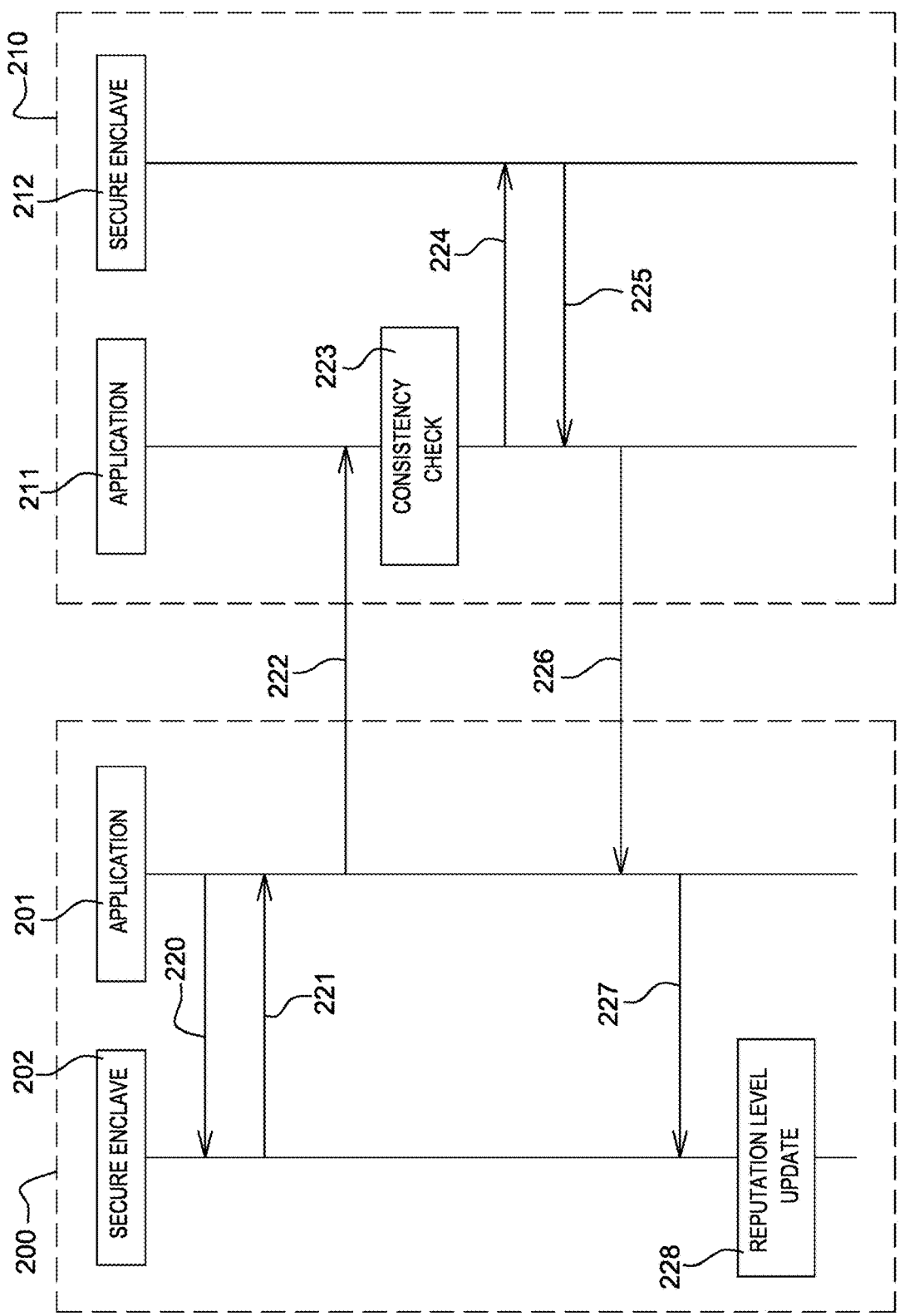
FIG. 2 is an example of sequence diagram showing how the reputation level of a first communication device can be updated thanks to the feedback received from a second communication device.

FIG. 2 is an example of sequence diagram showing how the reputation level of a first communication device can be updated thanks to the feedback received from a second communication device.

In this example, the interactions between four functional components are described. The functional components that are involved are:
  the secure enclave 202 and an application 201 of the first communication device 200 and
  the secure enclave 212 and an application 211 of the second communication device 210.

At the beginning, the first communication device 200 identifies that an information message has to be transmitted to the surrounding devices. According to this example, the first and second communication devices 200, 210 are two connected vehicles and the information message to be transmitted to the second communication device 210 is that the first communication device 200 braked suddenly. It should be noted that the invention is also applicable to other types of communication devices and other types of information messages, for example boats or planes that are changing direction.

Then, the application 201 sends 220 the information message to be transmitted to the secure enclave 202. A signature is generated by the secure enclave using the private key of the electronic certificate. Then, the information message to be transmitted is returned 221 to the application 201 together with the newly generated signature.

According to one aspect of the invention, the reputation level currently stored in the secure enclave can be send to the application 210 together with the information message and the signature. In that case, the signature can be generated taking as an input the information message and the reputation level.

The application 201 then transmits 222 the information message, the signature and optionally the reputation level of the first communication device 200 to the application 211 of the second communication device 210. The public key of the electronic certificate can also be transmitted.

At this stage, the application 211 checks that the received information comes from an authenticated source. For that purpose, it verifies the received signature using the public key that has been received for that purpose.

Then, the application verifies 223 the consistency of the received information message with local data. According to an embodiment of the invention, data used for this verification comes from at least one sensor associated to communication device 210. As an example, a connected car generally embeds one or several sensors. This or those sensors can be chosen among this non limitative list provided here for explanatory purpose: a video camera, a satellite navigation receiver, a temperature sensor, a velocity sensor, an accelerometer, an infrared proximity sensor, a night vision camera.

According to an example, the information message received by the second connected car 210 indicates that the first connected car braked suddenly. The second connected car 210 can use the images captured by an embedded video camera on which the first connected car appears in order to evaluate if the first connected car really applied heavy braking.

The result of this consistency verification 223 is transmitted 224 to the secure enclave 212 of the second communication device 210 which will be in charge of generating securely a feedback message. For that purpose, the secure enclave 210 can use a private key associated to an electronic certificate that has been provisioned during the manufacturing of the communication device.

For example, the feedback message is a binary data indicating that the received information message is consistent with the local information or that it is inconsistent. This feedback message can be transmitted 225, 226 together with an electronic signature generated on the feedback message using the private key of the electronic certificate associated to the secure enclave 212.

Once the feedback message is received by the application 201 of the first communication device 200, it is then transmitted 227 to the secure enclave 202 and it can be authenticated using the public key associated to the electronic certificate associated to the secure enclave 212 of the second communication device 210. Once authenticated, the feedback message is used by the secure enclave 202 to update 228 the reputation level of the first communication device 200.

According to an example, the reputation level r_l is an integer variable that can take N different values.

If the feedback message indicates that the consistency has been positively verified, r_l can be updated as follow:

$$r\_l = r\_l + \text{IncStep}$$

where IncStep is a positive integer parameter used to increase r_l.

If the feedback message indicates that the information message was not consistent with the local data obtained by the second communication device 210, r_l can be updated as follow:

$$r\_l = r\_l - \text{DecStep}$$

where DecStep is a positive integer parameter used to decrease r_l.

The reputation level is updated by the secure enclave of the first communication device which is not accessible to any user of the first communication device.

Similarly, feedback messages are generated by the secure enclave 202 of the first communication device 200 when receiving an information message from the second communication device 210. The secure enclave 212 can then update the reputation level of the second communication device 210.

This mechanism allows each communication device to maintain its own reputation level autonomously. The secure enclaves provide the necessary security to avoid tampering. Therefore, the invention allows peer devices to maintain their own reputation level taking into account feedback messages received from their peers. A communication device that is not anymore trustable will see its reputation level decrease. Advantageously, a communication device generating erroneous information messages because it has been modified by a malicious person because it is obsolete or defective will see its reputation level decrease drastically. The other communication device will then consider it as not trustable and can decide to ignore these information messages.

Further, the owner of a communication device receiving negative feedback may be information by an alert that something goes wrong, for example that one of its sensor does not work correctly. For that purpose, an alert message indicating the reason of the negative feedback can be transmitted together with the feedback message. It is generated for example at the time of verifying the consistency of the information message.

Figures 3, 4, 5A, 5B:
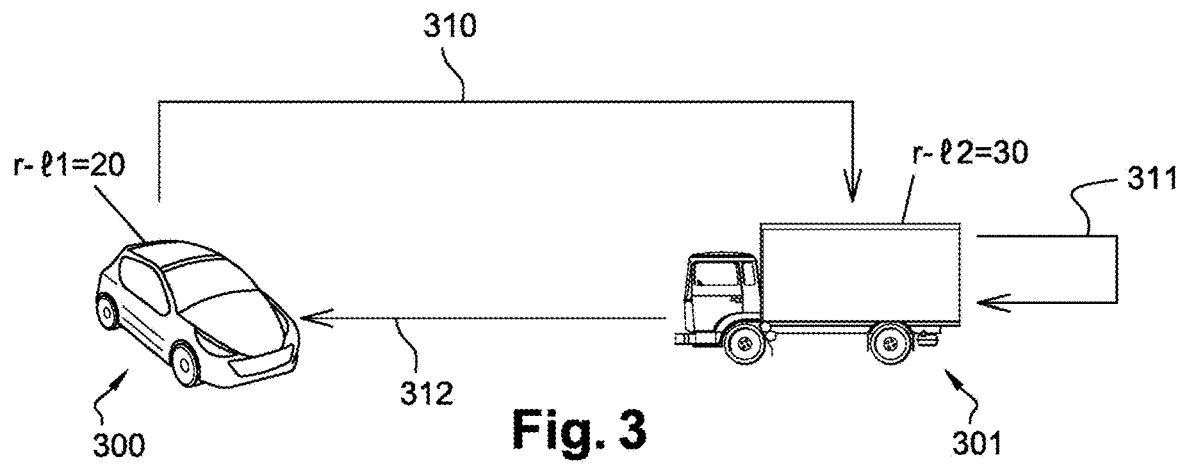
FIG. 3 illustrates how the reputation level maintained in a secure enclave of a given communication device can be used for increasing the security in the context of vehicle to vehicle communications.
FIG. 4 is a table illustrating how feedback messages coming from communication devices behaving erratically can be handled.
FIGS. 5A and 5B illustrate an example of mechanism that can be used by the communication device to defend against replay attacks.

FIG. 3 illustrates how the reputation level maintained in a secure enclave of a given communication device can be used for increasing the security in the context of vehicle to vehicle communications.

According to this example, two communication devices are involved. The first communication device is a connected car 300 and the second communication device is a connected truck 301. In this example, the reputation level is defined as an integer comprised between one and thirty. The reputation level r_l1 of the connect car 300 is set to twenty and the reputation level r_l2 of the connected truck 301 is set to thirty.

At some point in time, the connected car brakes suddenly. As a consequence, an application implemented in the connected car 300 generates an information message in order to inform the surrounding communication devices of this event. According to this example, the information message is transmitted together with the reputation level r_l1 maintained in the device.

Once received, an application embedded into the connected truck 301 then analyses the content of what has been received. In particular, it checks the reputation level of the sender. According to an embodiment, the received reputation level r_l1 is used to determine 311 whether the received information message should be considered or discarded by the connecter truck 301. An example of criteria that can be used for that purpose is to compare the received reputation level to a predetermined threshold. If this threshold is set to fifteen, and as the received r_l1 value is above this threshold as it is equal to twenty, the sender is considered as reliable enough and the information message can therefore take into account by the connected truck.

In addition, and as described thanks to FIG. 2, the consistency of the received information message can be checked. A feedback message 312 can then be generated and transmitted to the connected car 300 for him to update r_l1. As an example, if the feedback message that the information message is consistent, r_l1 value can be increased and set to twenty-one. On the contrary, if the feedback message indicates that the consistency of the transmitted information message could not be positively checked, r_l1 value can be decreased and set to nineteen.

Once the sender of the information message is identified as reliable enough based on its transmitted reputation level and if the consistency of the transmitted information is successfully verified, the information message can be used by the connected truck 301.

Depending on the type of information received, it may not always be possible to verify the consistency of the received information with data obtained locally by the second communication device 301. In that case, several alternatives can be considered. A first alternative is to generate a feedback message indicating that the consistency of the transmitted information could not be checked by the receiver. In other words, the feedback will be interpreted as neutral (not positive nor negative). Another alternative is not to send any feedback message for this information message.

When the consistency cannot be verified, the receiver of the information message, here the connected truck 301, can decide to take into account the content of the information message, using for example a predefined threshold value that is higher than the one used in case the consistency of the received information message can be verified.

According to an aspect of the invention, one communication device can be associated to more than one reputation level. In that case, each reputation level can be associated to a subsystem or topic. For example, fir a given connected car, one reputation level will be associated to the braking and another reputation level will be associated to the changes of direction.

FIG. 4 is a table illustrating how feedback messages coming from communication devices behaving erratically can be handled.

When a device is behaving sometimes correctly and sometimes incorrectly, for example due to evolving operating conditions, the content of the feedback messages that are received may change drastically. In order to take this into account for maintaining a reputation level representative of the reliability of this communication device, a counter of feedback can be introduced. This counter of feedbacks is used to compute a level of trust.

In the FIG. 4, device 1 has received hundred percent of the feedbacks expected, that is to say that one feedback is received for each message. As a consequence, consequence its level of trust is hundred percent.

Device 2 has received seventy-five percent of the feedbacks expected, in consequence the level of trust for its reputation is equal to seventy-five percent.

FIGS. 5A and 5B illustrate an example of mechanism that can be used by the communication device to defend against replay attacks.

According to this example, a counter is incremented by a given communication device each time an information message is transmitted.

Preferably, the counter is maintained and incremented by the secure enclave of the communication device.

Then, an anti-replay window of length N is defined. This verification window corresponds to N successive information messages. For example, a counter is incremented each time an information message is transmitted. The verification window identifies the N successive messages for which a feedback message is expected by the index of the counter corresponding to the N information messages transmitted by the communication device.

According to the example provided with FIGS. 5A and 5B, the length of the anti-replay window is equal to five. The feedback messages associated to the counter value "154-158" are monitored in a way that only one feedback is taken into account for each of the N transmitted information messages. Alternatively, a predefined maximum of M feedback messages could be taken into account for each transmitted information message.

As an example, the index of the counter is transmitted together with its associated information message. The feedback message is then provided with the information needed to update the reputation level and the index of the information message for which the consistency was verified.

The anti-replay mechanism can then be applied as follow.

When a feedback message received with index "150" is received, it is rejected (not taken into account) as the index value is outside of the anti-replay window.

When a feedback message received with index "159" is received, it is rejected as the index value is outside of the anti-replay window.

When a feedback message received with index "156" is received, it is rejected as a feedback has already been received for the same index.

When a feedback message received with index "154" is received, it is accepted and will impact the reputation level of the communication device.

When a new information message is transmitted, the counter is incremented to "159" and the window corresponds to information messages indexed "155-159".

Figure 6:
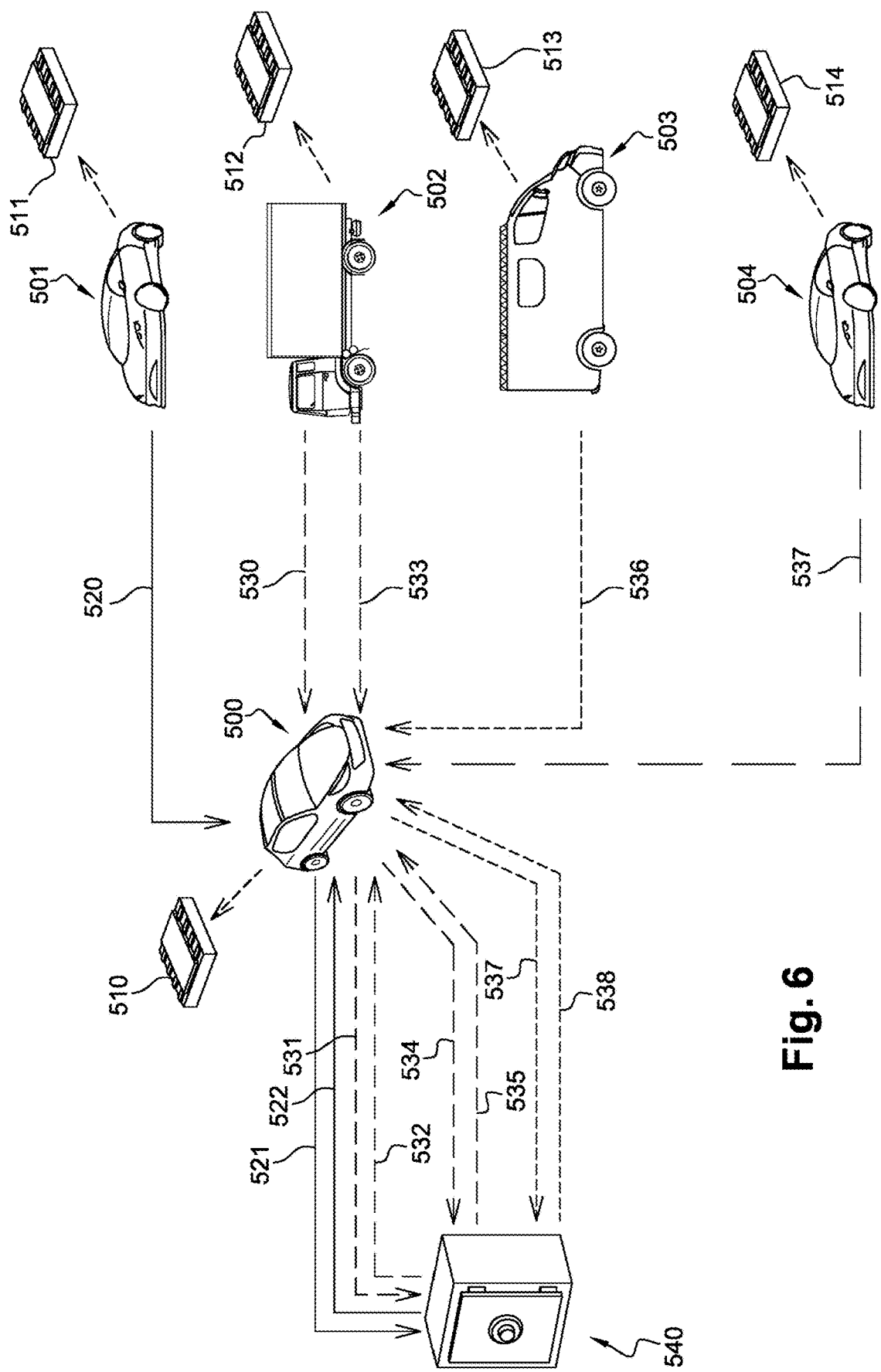
FIG. 6 provides an example where a third party is used to avoid forgery of the reputation level update system when a plurality of vehicles are controlled by the same entity.

FIG. 6 provides an example where a third party is used to avoid forgery of the reputation level update system when a plurality of vehicles are controlled by the same entity.

According to this embodiment of the invention, there is provided a mechanism designed to avoid different communication devices controlled by the same entity to manipulate their reputation level by artificially generating feedback messages. According to this example, four communication devices 501-504 embedding respectively four secure enclaves 511-514 are providing another communication device 500 with their feedback messages 520, 530, 533, 536, 537. The secure enclave 510 of communication device 500 is responsible of maintaining its reputation level.

The feedback message is associated with an identifier of its emitter, for example a signature generated using a private key memorised in the secure enclave 511-514.

In this example, an external trusted authority 540 and maintains a counter while communication device memorizes a counter threshold. This threshold defines the number of positive feedback received for the same information message before communication device 500 is able to increase its reputation level.

When communication device 500 receives a feedback message, it transfers it to the trusted authority 540 that is responsible of incrementing a counter for a given information message. According to this example, the car 501 transmits a positive feedback message 520 associated to an identifier of its emitter to communication device 500 and it is then transmitted 521 to the external trusted authority 540. The trusted authority already received three positive feedbacks for the same information message and 521 is the first received from communication device 501. As consequence, the external trusted authority increment a counter maintained for this information message from three to four. Then, a message is sent back 522 to communication device 500.

The same mechanism is applied when communication device 502 provides to communication device 500 a positive feedback message 530 for the same information message. It is transmitted 531 to the external trusted authority 540, the counter is incremented to five and its value is then transmitted 532 to communication device 500.

In this example, a second positive feedback is sent 533 by 502 for the same information message. It is transmitted 534 to the external trusted authority 540, but in that case, the counter is not incremented as a positive feedback has already been received from 502 for the same information message. The counter value which remains equal to five is then transmitted 535 to communication device 500.

Communication device 503 also provides to communication device 500 a positive feedback message 536 for the same information message. It is transmitted 537 to the external trusted authority 540, the counter is incremented to six and its value is sent 538 to communication device 500. At this stage, the threshold value memorized by 500 is reached, which triggers the update of its reputation level.

As the threshold value is now reached for this information message, other positive feedback received 537 from other communication devices 504 are not anymore transmitted to the external trusted authority 540.

The invention claimed is:

1. A method for managing a reputation level of a peer first communication device in communication with a peer second communication device, the both peer first and peer second communication devices maintaining similarly, autonomously, securely and locally their own reputation levels in their own respective first and second secure enclaves respectively embedded in said peer first and peer second communication devices, the method comprising:
   receiving from the peer first communication device by the peer second communication device an information message;
   verifying by the peer second communication device that the information message is consistent with local data obtained from a sensor embedded in the peer second communication device;
   generating a feedback message by the peer second communication device indicating if the information message is consistent based on the verification for the first secure enclave of the peer first communication device;
   transmit by the peer second communication device the feedback message to the peer first communication device for the first secure enclave to update the reputation level of said peer first communication device according to the feedback message, the both peer first and peer second communication devices thug maintaining their own reputation levels taking into account feedback messages received from other peer communication devices.

2. The method according to claim 1, wherein the reputation level of the peer first communication device is received by the peer second communication device together with the information message, the information message being considered as a trusted information by the peer second communication device if the received reputation level is greater than a predefined threshold.

3. The method according to claim 1, wherein the information message is received together with a signature generated by the first secure enclave using a security key, said first secure enclave storing the security key, the method further comprising verifying by the peer second communication device a security signature in order to authenticate the peer first communication device as an emitter of said information message.

4. The method according to claim 1, wherein the feedback message is either positive in case the information message is consistent with the local data obtained from the sensor embedded in the peer second communication device or negative otherwise.

5. The method according to claim 4, wherein the reputation level of the peer first communication device is increased when receiving a positive feedback message.

6. The method according to claim 4, wherein the reputation level of the peer first communication device is decreased when receiving a negative feedback message.

7. A peer first communication device comprising a first central processing unit interfaced to a first secure enclave storing a reputation level of said peer first communication device, said peer first communication device being in communication with at least a peer second communication device comprising a second central processing unit interfaced to a second secure enclave storing a reputation level of said peer second communication device, said peer first communication device being configured to:
- send to the peer second communication device an information message;
- receive from the peer second communication device a feedback message generated by the peer second communication device and representative of a result of a verification performed by said peer second communication device of a consistency of the information message with at least one local data obtained from a sensor embedded in the peer second communication device;
- update the reputation level of said peer first communication device by the first secure enclave according to the received feedback message, the both peer first and peer second communication devices thus maintaining similarly, autonomously, securely and locally their own reputation levels taking into account feedback messages received from peer communication devices in their own respective first and second secure enclaves respectively embedded in said peer first and peer second communication devices.

8. The peer first communication device according to claim 7 configured to transmit the information message together with the reputation level of said peer first communication device for said information message to be taken into account by the peer second communication device only if said reputation level of said peer first communication device is greater than a predefined threshold.

9. The peer first communication device according to claim 7, wherein a sliding window of length N corresponding to last N successive information messages that have been transmitted is used to have only feedback messages corresponding to the last N successive information messages are taken into account to update the reputation level of said peer first communication device.

10. The peer first communication device according to claim 9, wherein a maximum of M feedback messages is taken into account for a given information message.

11. A peer second communication device comprising a second central processing unit interfaced to a second secure enclave storing a reputation level of said peer second communication device, said peer second communication device being in communication with at least a peer first communication device comprising a first central processing unit interfaced to a first secure enclave storing a reputation level of said peer first communication device, said peer second communication device being configured to:
- receive an information message from the peer first communication device;
- verify that the information message is consistent with at least one local data obtained from a sensor embedded in the peer second communication device;
- generating a feedback message indicating if the information message is consistent based on the verification and transmitting said feedback message to the peer first communication device for the first secure enclave of the peer first communication device to update the reputation level of said peer first communication device, the both peer first and peer second communication devices maintaining similarly, autonomously, securely and locally their own reputation levels taking into account feedback messages received from peer communication devices in their own respective first and second secure enclaves respectively embedded in said peer first and peer second communication devices.

12. The peer second communication device according to claim 11 comprising a second secure enclave configured to generate a security signature to be transmitted together with the feedback message for the peer first communication device-to be capable of authenticating the peer second communication device.

13. A communication system comprising at least:
- a peer first communication device comprising a first secure enclave storing a reputation level of said peer first communication device, said peer first communication device being in communication with at least a peer second communication device comprising a second secure enclave storing a reputation level of said peer second communication device, said peer first communication device being configured to:
  - send to the peer second communication device an information message;
  - receive from the peer second communication device a feedback message generated by the peer second communication device and representative of a result of a verification performed by said peer second communication device of a consistency of the information message with at least one local data obtained from a sensor embedded in the peer second communication device;
  - update the reputation level of said peer first communication device by the first secure enclave according to the received feedback message; and
- the peer second communication device being configured to:
  - receive the information message from the peer first communication device comprising the first secure enclave storing the reputation level of said peer first communication device;
  - verify that the information message is consistent with the at least one local data obtained from the sensor embedded in the peer second communication device;
  - generate the feedback message indicating if the information message is consistent and transmit said feedback message to the peer first communication device for the first secure enclave of the peer first communication device to update the reputation level of said peer first communication device, the both peer first and peer second communication devices thus maintaining similarly, autonomously, securely and locally their own reputation levels taking into account feedback messages received from peer communication devices in their own respective first and second secure enclaves respectively embedded in said peer first and peer second communication devices.

14. The communication system of claim 13, wherein the peer first communication device is further configured to transmit the information message together with the reputation level of said peer first communication device for said information message to be taken into account by the peer second communication device only if said reputation level of said peer first communication device is greater than a predefined threshold.

15. The communication system of claim 14 wherein a sliding window of length N corresponding to last N successive information messages that have been transmitted is used to have only feedback messages corresponding to the last N successive information messages are taken into account to update the reputation level of said peer first communication device.

16. The communication system of claim 15 wherein a maximum of M feedback messages is taken into account for a given information message.

17. The communication system of claim 15 wherein the peer second communication device comprises a second secure enclave configured to generate a security signature to be transmitted together with the feedback message for the peer first communication device to be capable of authenticating the peer second communication device.

18. A non-transitory memory comprising a computer program product storing instructions which, when the computer program product is executed by a computer, cause the computer to carry out operations for managing a reputation level of a peer first communication device, said reputation level of said peer first communication device being stored into a first secure enclave embedded in said peer first communication device, the operations comprising:

receiving from the peer first communication device by a peer second communication device an information message;

verifying by the peer second communication device that the information message is consistent with local data obtained from a sensor embedded in the peer second communication device;

generating a feedback message by the peer second communication device indicating if the information message is consistent based on the verification for the first secure enclave of the peer first communication device;

transmit by the peer second communication device the feedback message to the peer first communication device for the first secure enclave to update the reputation level of said peer first communication device according to the feedback message, the both peer first and peer second communication devices maintaining similarly, autonomously, securely and locally their own reputation levels taking into account feedback messages received from peer communication devices in their own respective first and second secure enclaves respectively embedded in said peer first and peer second communication devices.

* * * * *